(12) United States Patent
Gill

(10) Patent No.: US 6,980,406 B2
(45) Date of Patent: Dec. 27, 2005

(54) MAGNETIC BIAS PINNING LAYER FOR GMR SENSOR OF A MAGNETIC HEAD FOR A HARD DISK DRIVE

(75) Inventor: Hardayal Singh Gill, Palo Alto, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 104 days.

(21) Appl. No.: 10/631,340

(22) Filed: Jul. 30, 2003

(65) Prior Publication Data
US 2005/0024796 A1 Feb. 3, 2005

(51) Int. Cl.⁷ .............................. G11B 5/39
(52) U.S. Cl. .............................. 360/324.12
(58) Field of Search .............. 360/324.12, 324.11, 360/324.1, 324, 313, 110, 327.3, 327.31

(56) References Cited

U.S. PATENT DOCUMENTS

| 6,671,139 B2 * | 12/2003 | Carey et al. ........... 360/324.12 |
| 2003/0137781 A1 * | 7/2003 | Carey et al. ............. 360/324.2 |
| 2003/0179514 A1 * | 9/2003 | Pinarbasi ............... 360/324.11 |

* cited by examiner

Primary Examiner—Julie Anne Watko
(74) Attorney, Agent, or Firm—Robert O. Guillot; Intellectual Property Law Offices

(57) ABSTRACT

A giant magneto-resistive (GMR) sensor for a magnetic head for a hard disk drive is disclosed. The sensor includes: a free magnetic layer; a bias layer that provides a bias magnetic field to the free magnetic layer and a bias pinning layer that provides a stabilizing magnetic field to the bias layer and that has a width substantially longer than the width of the free magnetic layer. Embodiments of the invention may further include an anti-ferromagnetic layer having a width substantially longer than the width of the free layer, or both an anti-ferromagnetic layer and a pinned magnetic structure each having a width substantially longer than the width of the free layer.

22 Claims, 2 Drawing Sheets

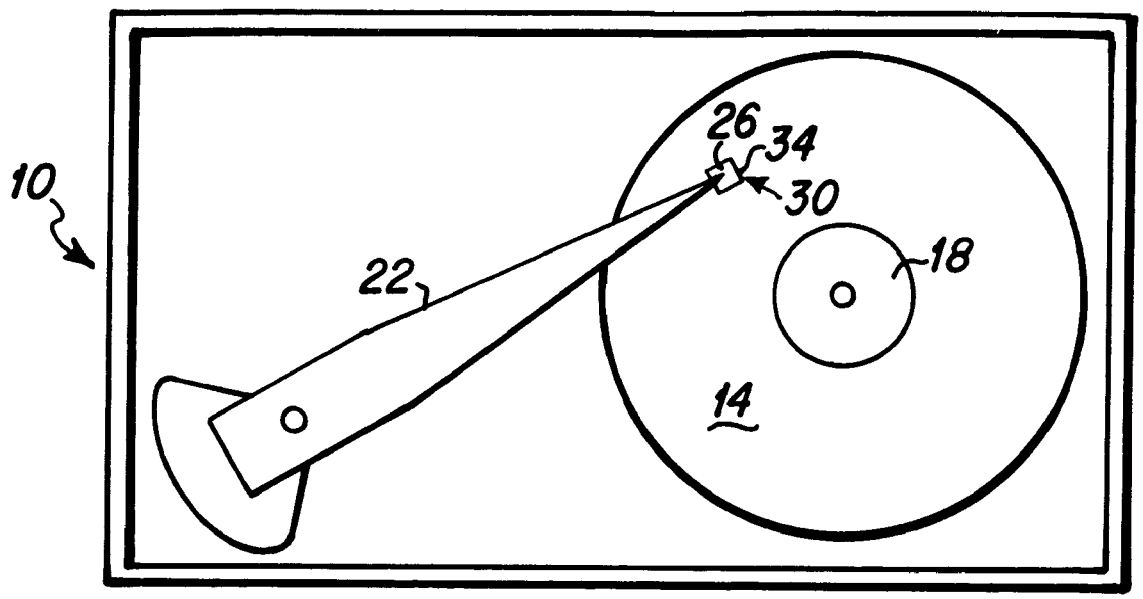
Fig.1
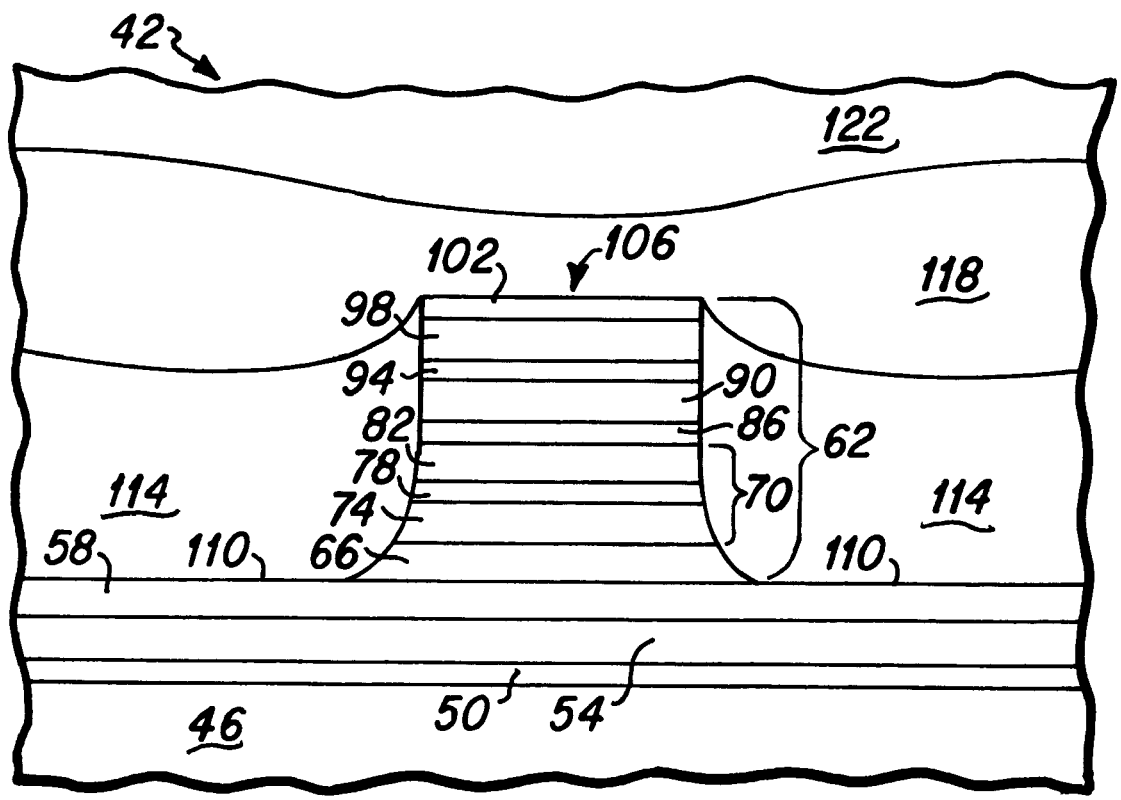
Fig.2 *(PRIOR ART)*

MAGNETIC BIAS PINNING LAYER FOR GMR SENSOR OF A MAGNETIC HEAD FOR A HARD DISK DRIVE

FIELD OF THE INVENTION

The invention relates generally to magnetic heads for hard disk drives, and more particularly to a giant magneto-resistive (GMR) sensor having a free magnetic layer, a magnetic bias layer, and a wide bias pinning layer.

BACKGROUND

An important goal of the hard disk drive industry is to develop magnetic heads for hard disk drives that provide ever faster data writing speeds, and that allow data to be written with ever increasing areal data storage density, that is, with more bits of data written per unit of disk area.

As is known to those skilled in the art, prior art magnetic head designs include a GMR sensor having a plurality of thin film layers that include a free magnetic layer and a bias layer. As the magnetic head passes over various data bit positions along a data track on the disk, the magnetic field of the free magnetic layer rotates in response to the magnetic fields of the data bits recorded on the hard disk. The bias layer has relatively high magnetic coercivity and acts as a hard or permanent magnet to provide a bias magnetic field that biases the free magnetic layer. Under the influence of this bias magnetic field, the magnetic fields of the free magnetic layer are generally stable and oriented in a single direction.

A problem arises in using a bias layer in a read head designed for a narrow track width, specifically, the magnetic domains within the bias layer can become unstable due to thermal and other stresses. When these effects occur the bias layer tends to loose its ability to stabilize the free magnetic layer.

SUMMARY OF THE INVENTION

The invention seeks to stabilize the bias layer by providing a bias pinning layer that includes a high coercivity material and that has a width that is substantially greater than the width of the bias layer. This stabilization allows for a decrease in the read track width and facilitates increased areal data storage density in hard disk drives that employ a magnetic head according to the invention.

The magnetic head of the present invention includes a GMR sensor having a free magnetic layer, a bias layer that is parallel to the free magnetic layer which induces a bias magnetic field in the free magnetic layer, and a bias pinning layer that is parallel to the bias layer. The bias pinning layer has a width that is substantially greater than the width of the bias layer, and it is configured to induce a stabilization of the magnetic field in the bias layer.

Embodiments of the invention may also include a pinned magnetic layer structure having a width that is substantially greater than the width of the free magnetic layer, or both an anti-ferromagnetic layer and a pinned magnetic layer structure each having a width that is substantially greater than the width of the free magnetic layer.

BRIEF DESCRIPTION OF THE DRAWINGS

Objects, features and advantages of the invention will become apparent from the descriptions and discussions herein, when read in conjunction with the drawings. The drawings are generally not drawn to scale, and the relative sizes of the elements shown may be distorted to clarify features of the invention. Thus the shapes shown for the elements may vary substantially from their actual shapes.

FIG. 1 is a top view of a disk drive that includes a magnetic head according to an embodiment of the invention;

FIG. 2 is an elevational view of the air bearing surface of a read head of a prior art magnetic head;

DETAILED DESCRIPTION OF THE PREFERRED EMBODIMENTS

Figure 3:
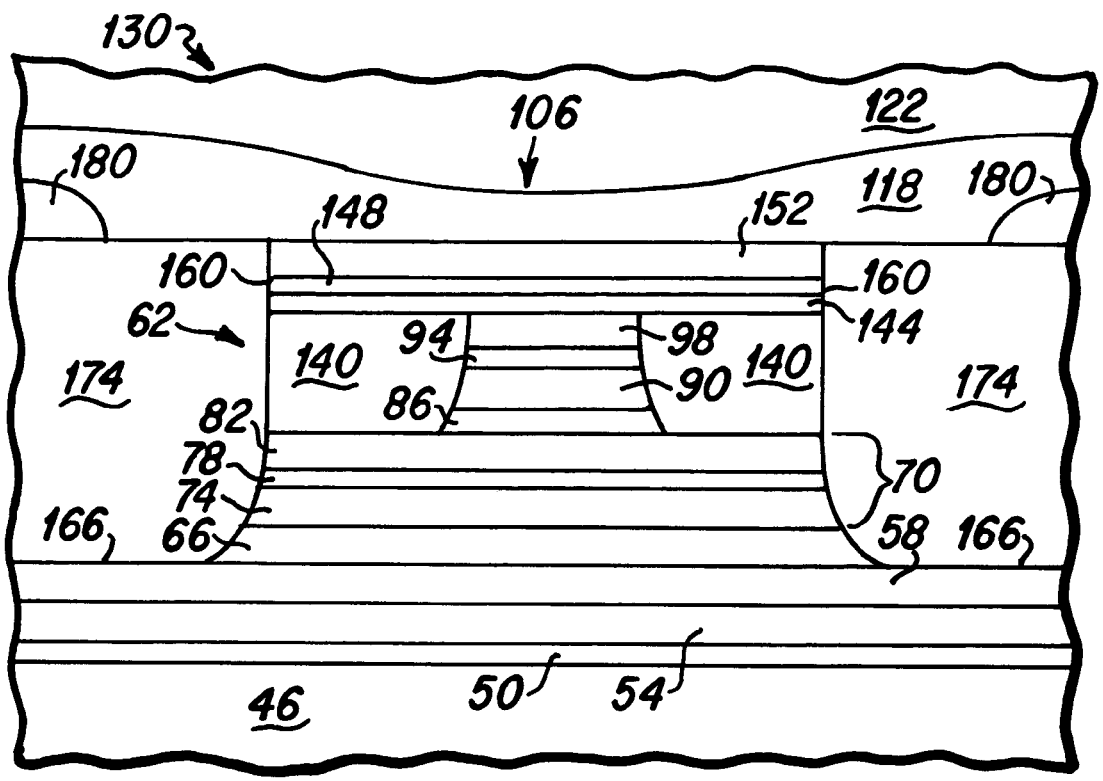
FIG. 3 is an elevational view of the air bearing surface of a read head of a magnetic head according to an embodiment of the invention.

The descriptions, discussions and figures herein illustrate technologies related to the invention, show examples of the invention, and give examples of using the invention. Known methods, procedures, systems, or elements may be illustrated and described without giving details so as to avoid obscuring the principles of the invention. On the other hand, details of specific embodiments of the invention are presented, even though such details may not apply to other embodiments of the invention.

FIG. 1 is a top plan view that depicts significant components of a hard disk drive 10 according to an embodiment of the invention. The hard disk drive 10 includes at least one magnetic media hard disk 14 that is rotatably mounted upon a motorized spindle 18. An actuator arm 22 is pivotally mounted within the hard disk drive 10, and a slider 26 is mounted upon the distal end of the actuator arm 22. The slider 26 has a trailing surface 30 that includes a magnetic head 34 according to an embodiment of the invention. A typical hard disk drive 10 may include a plurality of disks 14 that are rotatably mounted upon the spindle 14 and a corresponding plurality of the actuator arms 22. As is known to those skilled in the art, when the hard disk drive 10 is operated, the hard disk 14 rotates upon the spindle 18 and the slider 26 glides above the surface of the hard disk 14. The surface of the slider 26 that is proximate to hard disk 14 is known as the air bearing surface.

In manufacturing such magnetic heads, a multiplicity of magnetic heads are simultaneously fabricated by coating a series of layers upon the surface of a wafer that is formed from a head substrate material. The wafer is then separated into individual magnetic heads. The surface formed by one of the separations is polished to form the air bearing surface of the magnetic head.

FIG. 2 is an elevational view of the air bearing surface of a read head 42 of a prior art magnetic head. The read head 42 includes a head substrate 46, an undercoat insulation layer 50 that is deposited upon the surface of the substrate 46, a first magnetic shield (S1) layer 54 that is deposited upon the undercoat layer 50, and a first gap (G1) layer 58 that is deposited upon the first shield layer 54. The read head 42 further includes a plurality of sensor layers 62, which include an anti-ferromagnetic layer 66, a pinned magnetic layer structure 70, a spacer layer 86, a free magnetic layer 90, a bias spacer layer 94, a bias layer 98, and a cap layer 102. The pinned magnetic layer structure 70 may include a first pinned magnetic layer 74, an anti-parallel coupling layer 78, and a second pinned magnetic layer 82

The anti-ferromagnetic layer 66 is formed by depositing a material including but not limited to platinum manganese (PtMn) upon the first gap layer 58. The first pinned layer 74 is formed by depositing a ferromagnetic material upon the anti-ferromagnetic layer 66. The anti-parallel coupling layer 78 is formed by depositing a nonmagnetic material upon the first pinned layer 78, and is preferably but not necessarily a layer of ruthenium (Ru) approximately 8 angstroms (Å) thick. The second pinned layer 82 is formed by depositing a ferromagnetic material upon the anti-parallel coupling layer 78. Typically but not necessarily, the first and second pinned layers 74 and 82 have the same thickness (approximately 18 Å for example), and are composed of cobalt iron (CoFe).

The spacer layer 86 is formed by depositing a nonmagnetic metal, typically but not necessarily copper (Cu), upon the second pinned layer 82. The free magnetic layer 90 is formed by depositing a ferromagnetic material upon the spacer layer 86, and cobalt iron (CoFe) or nickel iron (NiFe) are typically but not necessarily used. The thickness of the free magnetic layer is typically from approximately 20 Å to approximately 50 Å with a preferred thickness of approximately 30 Å. The bias spacer layer 94 is formed by depositing a nonmagnetic material upon the free magnetic layer 90. The bias spacer layer 94 may be made of, among other materials, ruthenium (Ru), copper (Cu), tantalum (Ta), or chromium (Cr). Typically but not necessarily, the bias spacer layer 94 has a thickness between 5 Å and 45 Å, and preferably approximately 10 Å to approximately 30 Å. The bias layer 98 is formed by depositing a ferromagnetic material with a high magnetic coercivity and a high resistivity upon the bias spacer layer 94. The bias layer is preferably formed of a high magnetic moment material such as Co, $Co_{30}Fe_{70}$ (that is, a combination of 30 at. % Co and 70 at. % Fe, where at. % is "atomic percentage"), $Co_{49}Fe_{49}V_2$, Fe and FeN. Because the bias layer has a higher magnetic moment than the free magnetic layer, it can be thinner than the free magnetic layer, and a typical thickness of the bias layer is from approximately 10 Å to approximately 25 Å with a preferred thickness of from 10 to 15 Å. It is desirable that the spacer layer and the bias layer be as thin as they can be to reduce electrical current shunting from the electrical leads through them. A cap layer 102, typically composed of tantalum, and having a thickness of approximately 40 Å is deposited top of the bias layer to protect it during subsequent fabrication steps.

Following the deposition of the sensor layers 62, photolithographic steps are performed to create an ion beam etching mask layer that covers the central portion 106 of the sensor layers. Thereafter, an ion beam etching step is undertaken in which outer portions of the sensor layers are removed. This etching removes unprotected sensor layer material down to the first gap layer 58, such that the central portion 106 of the sensor layers 62 remain and the side portions 110 of the first gap layer 58 are exposed.

The read head portion 42 further includes two electrical lead layers 114, a second gap (G2) layer 118, and a second shield (S1) layer 122. The lead layers 114 are formed by depositing a metal such as rhodium (Rh) or tantalum (Ta) on top of the exposed portions 110 of the first gap layer 58. The second gap (G2) layer 118 is formed by depositing an insulation material across the wafer, and the second magnetic shield (S2) layer 122 is then fabricated by depositing a ferromagnetic material on top of the second gap layer 118.

In addition to the read-head 42, the prior art magnetic head typically includes a further insulation layer (not shown) that is deposited upon the second shield layer 122 and that serves to insulate and separate the read-head from a subsequently fabricated write-head (not shown) of the prior art magnetic head. These elements are well known in the art. The insulation layer between the read head and the write head may be omitted in magnetic heads (termed merged heads) where a single layer functions both as the second shield layer 122 and as a magnetic pole element within the write head that is subsequently fabricated.

As is well understood by those skilled in the art, due to the influence of the bias magnetic field from the bias layer 98, the magnetic field within the free magnetic layer 90 is stable and oriented in a single direction parallel to the air bearing surface. When the hard disk drive 10 is operated, the magnetic fields of the data bits of the magnetic disk 14 are strong enough to rotate the magnetic field in the free magnetic layer 94. This rotation changes the electrical resistance between the lead layers 114, and this change in resistance is detected as a data bit signal.

A problem that arises in using a bias layer in a read head designed for a narrow track width is that the magnetic domains within the bias layer can become unstable. When operating, the read head 42 is subjected to thermal and other stresses that can cause a narrow bias layer, such as the bias layer 98, to switch into different magnetic orientation. When these effects occur the bias layer tends to loose its ability to stabilize the free magnetic layer, rather than stabilizing it as desired. As is next described with the aid of FIG. 3, the present invention seeks to stabilize the bias layer 98 by providing a bias pinning layer that is formed of a high coercivity material, and that has a width that is substantially greater than the width of the bias layer 98. This bias layer stabilization facilitates the creation of magnetic heads having a decreased track width and allows for increased areal data storage density in hard disk drives that employ a magnetic head according to the invention.

FIG. 3 is an elevational view of the air bearing surface of a read head 130 within the magnetic head 34 according to an embodiment of the invention. Significantly, read head 130 includes a bias pinning layer 148, that is not present in the prior art read head 42. The read head 130 includes the S1 shield layer 54, G1 gap layer 58, anti-ferromagnetic layer 66, and a pinned magnetic layer structure 70 that may include a first pinned magnetic layer 74, an anti-parallel coupling layer 78 and a second pinned layer 82. Also included in the read head 130 are the spacer layer 86, the free magnetic layer 90, the bias spacing layer 94 and the bias layer 98. Each of these layers are deposited full film across the surface of the wafer and have been described hereabove with regard to the prior art read head depicted in FIG. 2.

Thereafter, in fabricating the read head 130 of the present invention, a sacrificial tantalum cap layer (not shown) having a thickness of approximately 40 Å is deposited on top of the bias layer 98. Thereafter, using photolithographic techniques, as described hereabove, a photoresist mask is fabricated above the central portion 106 of the sensor layers 62. Thereafter, an ion beam etching step is performed in which the unmasked, exposed side portions of the sensor layers 62 are etched down through the spacer layer 86 to the second pinned magnetic layer 82. Thereafter, an inner electrical lead layer 140 is deposited up to the tantalum cap layer (not shown). Thereafter, the photoresist mask is removed, exposing the tantalum cap layer.

The tantalum cap layer is next removed, such as through the use of a reactive ion etch process, utilizing a fluorine active species, whereupon the top surface of the bias layer 98 is exposed. Thereafter, a seed layer 144 for a bias pinning layer is deposited across the surface of the wafer. This seed layer deposition is followed by the deposition of a bias pinning layer 148 across the surface of the wafer. The bias pinning layer 148 is composed of a high coercivity, high electrical resistivity material, such as CoPtCr, CoSm and CoPt. Where CoPtCr is used for the bias pinning layer, an acceptable composition of CoPtCr will have a Cr concentration of from 8 to 20 at. % and a Pt concentration of approximately 12 at. %. Where CoSm is utilized, the Sm will have a concentration of from 10 to 50 at. %, with a preferred concentration of approximately 20 at. %. Where CoPt is utilized, a preferred Pt concentration is approximately 25 at. %. The seed layer 144 is desirably comprised of Fe—Cr which will lead to the development of high coercivity in the bias pinning layer 148. It is desirable that the bias pinning layer 148 be as thin as possible in order to avoid electrical shunting through it, and a thickness of approximately 10 to 50 Å is suitable with a preferred thickness of approximately 20 Å. Following the fabrication of the bias pinning layer 148, a cap layer 152, preferably comprised of tantalum and having a thickness of approximately 40 Å is deposited across the surface of the wafer.

As indicated hereabove, the bias pinning layer 148 is fabricated to provide magnetic stability to the narrow bias layer 98 that is fabricated above the free magnetic layer 90. To provide such stability, the bias pinning layer 148 is fabricated to be substantially wider than the bias layer 98, such that the magnetic properties of the bias pinning layer 148 will be less susceptible to thermal and other stresses that tend to destabilize the bias layer 98. It is therefore desired that the bias pinning layer 148 have a width that is at least approximately three times the width of the narrower bias layer 98, and the width of the bias pinning layer 148 may be ten times (or more) the width of the bias layer 98.

To fabricate the width of the bias pinning layer 148, a second photolithographic process is used to create an ion beam etching mask (not shown) having a width that covers the tantalum cap layer 152 to the desired outer edges 160 of the bias pinning layer 148. Thereafter, an ion beam etching step is performed in which the outer, unmasked layers are removed down to the surface 166 of the G1 gap layer 58. Thereafter, an outer lead layer 174, typically composed of rhodium or tantalum is deposited up to the surface of the tantalum cap layer 152. The photoresist mask is next removed and a chemical mechanical polish (CMP) planarizing step may next be performed to provide a smooth upper surface to the outer electrical leads 174 while leaving the tantalum cap 152 in place. Thereafter, further photolithographic and electrical lead deposition steps are undertaken, as are known in the prior art, to fabricate outer upper electrical leads 180 of the read head 130.

Another feature of the read head 130 of the present invention is that the width of the pinned magnetic layer structure 70 is also increased over that of the prior art read head depicted in FIG. 2. The increased width of the pinned magnetic layer structure 70 becomes important where the read track width of the sensor layers 62 is narrowed because such narrow layers tend to become magnetically unstable in thermal stress environments. The wider pinned magnetic layer structure 70 of the read head 130 is therefore more magnetically stable than the narrower pinned magnetic layer structure of the prior art read head 42.

Figure 4:
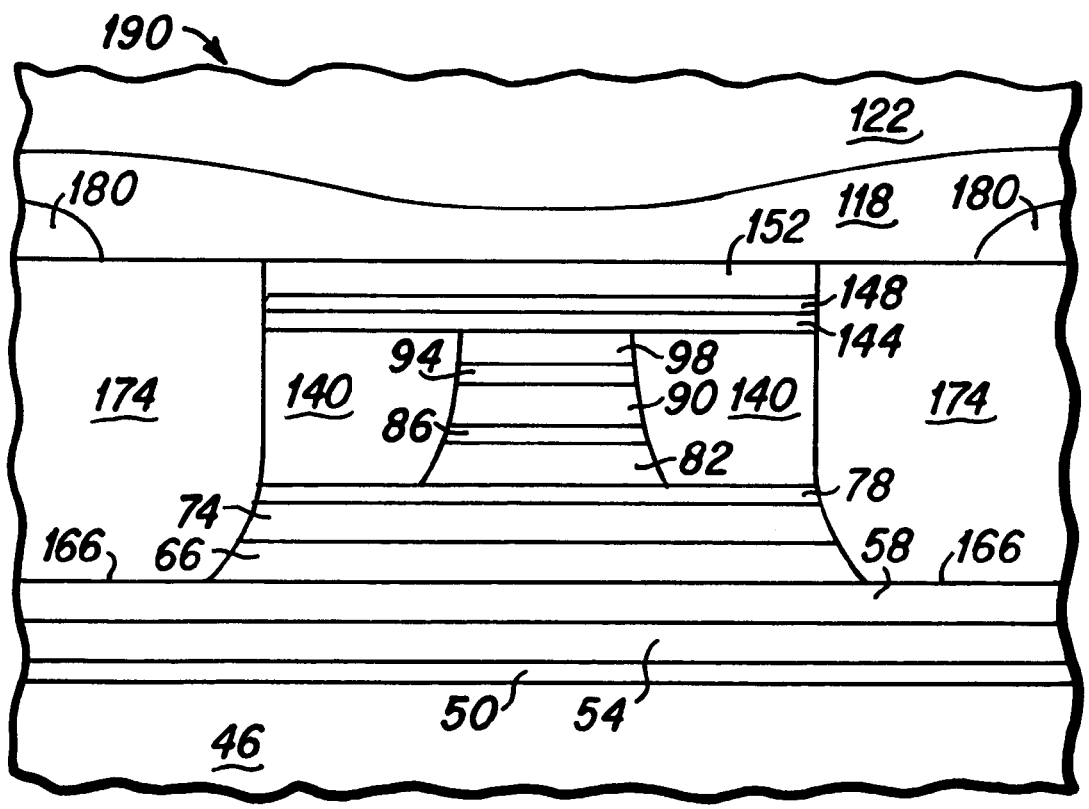
FIG. 4 is an elevational view of the air bearing surface of a read head of a magnetic head according to another embodiment of the invention.

A further embodiment of the present invention is depicted in the elevational view of FIG. 4. As can be seen by comparing the read head 130 of FIG. 3 with the read head 190 of FIG. 4, there are many similar structures and the similar structures of FIGS. 3 and 4 are identically numbered for ease of comprehension. Basically, the significant difference between the read head 190 of FIG. 4 and the read head 130 of FIG. 3 is that the depth of the first ion beam etching step is greater in read head 190. Specifically, in read head 190, the ion beam etching step is allowed to proceed down and remove the second pinned layer 82 of the pinned magnetic layer structure 70. Thus the width of the second pinned layer 82 in read head 190 is the same narrow width as the spacer layer 86 and the free magnetic layer 90. This narrow width of the second pinned layer 82 provides a more favorable magnetoresistive effect upon the free magnetic layer 90 than the wider pinned magnetic layer depicted in FIG. 3.

As will be understood by one skilled in the art, the material used to form the bias pinning layer 148 and the thickness of this layer may be selected in conjunction with each other, and in conjunction with the other design parameters of the read head 130 or 190, so as to pin the magnetic field within the bias layer 98 that stabilizes the magnetic orientation of the bias layer 98. In turn, the material used to form the bias layer 98 and the thickness of this layer may be selected in conjunction with each other, and in conjunction with the other design parameters of the read head portion 130 or 190, so as to produce a bias magnetic field within the free magnetic layer 90 that stabilizes the magnetic orientation of the free magnetic layer 90.

The scope of the invention is set forth by the following claims and their legal equivalents. The invention is subject to numerous modifications, variations, selections among alternatives, changes in form, and improvements, in light of the teachings herein, the techniques known to those skilled in the art, and advances in the art yet to be made. The figures and descriptions herein are intended to illustrate the invention by presenting specific details; they are not intended to be exhaustive or to limit the invention to the designs, forms and embodiments disclosed.

I claim:

1. A magnetic head comprising:
a free magnetic layer;
a bias layer having a width and being disposed parallel to the free magnetic layer and configured to induce a bias magnetic field in the free magnetic layer; and
a bias pinning layer disposed parallel to the bias layer, having a width that is greater than the bias layer width, and configured to induce a stabilization magnetic field in the bias layer.

2. A magnetic head according to claim 1, wherein the width of the bias pinning layer is at least three times the width of the bias layer.

3. A magnetic head according to claim 1, wherein the bias pinning layer includes cobalt samarium (CoSm) or cobalt platinum chromium (CoPtCr).

4. A magnetic head according to claim 1, wherein the bias pinning layer includes cobalt samarium having between 60 at. % and 95 at. % cobalt and between 40 at. % and 5 at. % samarium.

5. A magnetic head according to claim 1, wherein the bias pinning layer includes cobalt platinum chromium having between approximately 80 at. % and 68 at. % cobalt, approximately 12 at. % platinum, and between approximately 8 at. % and 20 at. % chromium.

6. A magnetic head according to claim 1, wherein the bias pinning layer has a thickness that is between approximately 10 angstroms (Å) and approximately 50 Å.

7. A magnetic head according to claim 1, wherein:
the bias pinning layer includes a bias pinning material and has a bias pinning thickness; and
the bias pinning material and the bias pinning thickness are selected such that the bias pinning layer has high coercivity and high resistivity.

8. A magnetic head according to claim 1, further including a pinned magnetic layer structure having a width that is substantially greater than a width of the free magnetic layer.

9. A magnetic head according to claim 1, further including:
an anti-ferromagnetic layer having a width that is substantially greater than a width of the free layer; and
a pinned magnetic layer structure having a width that is substantially greater than the width of the free magnetic layer.

10. A magnetic head according to claim 9 wherein the width of the pinned magnetic layer structure is at least three times the width of the free magnetic layer.

11. A magnetic head according to claim 1, further including a pinned magnetic layer structure including a first pinned magnetic layer, an antiparallel coupling layer and a second pinned magnetic layer, wherein said second pinned magnetic layer has a width that is approximately equal to a width of the free magnetic layer and the first pinned magnetic layer has a width that is at least three times the width of the second pinned magnetic layer.

12. A hard disk drive for reading and writing information in a magnetic medium, the disk drive comprising:
a disk having a surface that includes the magnetic medium;
a motor coupled to rotate the disk;
a slider having an air bearing surface;
an actuator configured to hold the air bearing surface of the slider proximate to the surface of the disk;
a magnetic head disposed within the slider and forming part of the air bearing surface, wherein the magnetic head includes:
i) a free magnetic layer;
ii) a bias layer having a width and being disposed parallel to the free magnetic layer and configured to induce a bias magnetic field in the free magnetic layer; and
iii) a bias pinning layer disposed parallel to the free magnetic layer and the bias layer, having a width that is greater than the bias layer width, and configured to induce a stabilization magnetic field in the bias layer.

13. A hard disk drive according to claim 12, wherein the width of the bias pinning layer is at least three times the width of the bias layer.

14. A hard disk drive according to claim 12, wherein the bias pinning layer includes cobalt samarium (CoSm) or cobalt platinum chromium (CoPtCr).

15. A hard disk drive according to claim 12, wherein the bias pinning layer includes cobalt samarium having between 60 at. % and 95 at. % cobalt and between 40 at. % and 5 at. % samarium.

16. A hard disk drive according to claim 12, wherein the bias pinning layer includes cobalt platinum chromium having between approximately 80 at. % and 68 at. % cobalt, approximately 12 at. % platinum, and between approximately 8 at. % and 20 at. % chromium.

17. A hard disk drive according to claim 12, wherein the bias pinning layer has a thickness that is between approximately 10 angstroms (Å) and approximately 50 Å.

18. A hard disk drive according to claim 12, wherein:
the bias pinning layer includes a bias pinning material and has a bias pinning thickness; and
the bias pinning material and the bias pinning thickness are selected such that the bias pinning layer has high coercivity and high resistivity.

19. A hard disk drive according to claim 12, further including a pinned magnetic layer structure having a width that is substantially greater than a width of the free magnetic layer.

20. A hard disk drive according to claim 12, further including:
an anti-ferromagnetic layer having a width that is substantially greater than a width of the free layer; and
a pinned magnetic layer structure having a width that is substantially greater than the width of the free magnetic layer.

21. A hard disk drive according to claim 20 wherein the width of the pinned magnetic layer structure is at least three times the width of the free magnetic layer.

22. A hared disk drive according to claim 12, furhter including a pinned magnetic layer structure including a first pinned magnetic layer, an antiparallel coupling layer and a second pinned magnetic layer, wherein said second pinned magnetic layer has a width that is approximately equal to a width of the free magnetic layer and the first pinned magnetic layer has a width that is at least three times the width of the second pinned magnetic layer.

* * * * *